(12) United States Patent
Gohl

(10) Patent No.: US 11,535,321 B1
(45) Date of Patent: Dec. 27, 2022

(54) TRAILER SYSTEM

(71) Applicant: Russell R. Gohl, Coleharbor, ND (US)

(72) Inventor: Russell R. Gohl, Coleharbor, ND (US)

( * ) Notice: Subject to any disclaimer, the term of this patent is extended or adjusted under 35 U.S.C. 154(b) by 0 days.

(21) Appl. No.: 17/894,583

(22) Filed: Aug. 24, 2022

(51) Int. Cl.
*B62D 63/08* (2006.01)
*B62D 61/04* (2006.01)
*B08B 9/043* (2006.01)
*B05C 11/10* (2006.01)
*B60D 1/48* (2006.01)

(52) U.S. Cl.
CPC .............. *B62D 63/08* (2013.01); *B05C 11/10* (2013.01); *B08B 9/043* (2013.01); *B60D 1/481* (2013.01); *B62D 61/04* (2013.01); *B08B 2209/04* (2013.01)

(58) Field of Classification Search
CPC ......... B62D 63/08; B62D 61/04; B05C 11/10; B08B 9/043; B08B 2209/04; B08B 9/093; B08B 9/0933; B08B 9/0936; B08B 9/02; B08B 9/04; B60D 1/481
See application file for complete search history.

(56) References Cited

U.S. PATENT DOCUMENTS

| | | | | | |
|---|---|---|---|---|---|
| 1,437,008 | A | * | 11/1922 | Otterson | E03F 7/10 210/241 |
| 1,561,744 | A | * | 11/1925 | Raymond | E03F 7/10 210/532.1 |
| 2,010,540 | A | * | 8/1935 | Ronald | E03F 7/10 210/523 |
| 2,767,415 | A | * | 10/1956 | Fredc | B08B 9/043 15/104.095 |
| 3,409,031 | A | * | 11/1968 | Benbow | B08B 9/043 134/1 |
| 3,658,589 | A | * | 4/1972 | Shaddock | B08B 9/0495 15/302 |
| 3,754,361 | A | * | 8/1973 | Branham | E21B 15/00 52/143 |
| 3,774,630 | A | * | 11/1973 | Prange | F16L 3/012 137/355.12 |
| 3,791,447 | A | * | 2/1974 | Smith | E21B 37/00 166/384 |
| 3,842,461 | A | * | 10/1974 | Wurster | E03F 7/10 55/467 |
| 3,958,594 | A | * | 5/1976 | Masters | B65H 75/38 137/355.12 |
| 4,066,093 | A | * | 1/1978 | Egerstrom | B65H 75/4415 405/303 |
| 4,103,841 | A | * | 8/1978 | Flynn | B65H 75/4402 242/403 |
| 4,135,340 | A | * | 1/1979 | Cox | E21B 15/00 52/125.2 |
| 4,199,837 | A | * | 4/1980 | Fisco, Jr. | E03F 7/103 15/352 |
| 4,234,980 | A | * | 11/1980 | DiVito | E03F 7/10 15/340.1 |

(Continued)

*Primary Examiner* — James A Shriver, II
*Assistant Examiner* — Conan D Duda
(74) *Attorney, Agent, or Firm* — Neustel Law Offices

(57) ABSTRACT

A trailer system for providing transportability for a cavity cleaning and coating system may include a frame, a bed that is attached to the frame, a pair of ground engaging elements that are attached to the frame, and a lifting and reclining assembly that is attached to the frame that is configured to raise and lower the cavity cleaning system into position over a cavity.

19 Claims, 12 Drawing Sheets

(56) References Cited

U.S. PATENT DOCUMENTS

| | | | | |
|---|---|---|---|---|
| 4,290,495 A * | 9/1981 | Elliston | ............... | E21B 19/084 173/147 |
| 4,322,868 A * | 4/1982 | Wurster | ............... | E03F 7/10 15/352 |
| 4,324,077 A * | 4/1982 | Woolslayer | ............... | E21B 15/003 173/186 |
| 4,367,145 A * | 1/1983 | Simpson | ............... | B01D 21/2427 210/241 |
| 4,371,041 A * | 2/1983 | Becker | ............... | E21B 15/04 173/147 |
| 4,454,999 A * | 6/1984 | Woodruff | ............... | B65H 49/24 242/397.2 |
| 4,540,017 A * | 9/1985 | Prange | ............... | B65H 75/441 137/355.12 |
| 4,543,183 A * | 9/1985 | Petretti | ............... | E03F 7/10 210/241 |
| 4,578,198 A * | 3/1986 | Schmidt | ............... | B01D 33/073 134/22.12 |
| 4,669,145 A * | 6/1987 | Kehr | ............... | B65H 75/4486 134/169 C |
| 4,690,006 A * | 9/1987 | Urata | ............... | G01B 5/0002 73/866.5 |
| 4,800,616 A * | 1/1989 | Wade | ............... | B08B 9/043 15/387 |
| 4,805,653 A * | 2/1989 | Krajicek | ............... | F28G 1/16 239/165 |
| 4,816,167 A * | 3/1989 | Vanderslice | ............... | E03F 7/10 210/801 |
| 4,831,795 A * | 5/1989 | Sorokan | ............... | E21B 15/00 52/120 |
| 4,838,302 A * | 6/1989 | Prange | ............... | E03F 7/10 242/397.3 |
| 4,854,058 A * | 8/1989 | Sloan | ............... | E02F 3/88 210/241 |
| 4,896,686 A * | 1/1990 | Schmidt, Jr. | ............... | B08B 9/0495 254/323 |
| 4,922,571 A * | 5/1990 | Driear | ............... | E03F 7/10 15/340.1 |
| 4,967,841 A * | 11/1990 | Murray | ............... | B08B 9/0433 134/22.12 |
| 4,993,443 A * | 2/1991 | Buchert | ............... | B08B 9/0495 134/179 |
| 5,002,438 A | 3/1991 | Strong | | |
| 5,068,940 A * | 12/1991 | Sheppard | ............... | B08B 9/027 15/302 |
| 5,086,842 A * | 2/1992 | Cholet | ............... | E21B 21/12 134/22.12 |
| 5,092,265 A | 3/1992 | Hughes | | |
| 5,106,440 A | 4/1992 | Tangeman | | |
| 5,129,957 A * | 7/1992 | Sheppard | ............... | B08B 9/0495 134/22.12 |
| 5,139,751 A * | 8/1992 | Mansfield | ............... | E03F 9/00 137/355.2 |
| 5,165,434 A * | 11/1992 | Tobiason | ............... | E03F 9/00 239/DIG. 13 |
| 5,246,181 A * | 9/1993 | Straub | ............... | B65H 75/425 254/323 |
| 5,248,005 A * | 9/1993 | Mochizuki | ............... | E21B 41/0021 175/219 |
| 5,265,981 A * | 11/1993 | McNeil | ............... | F16L 55/1654 405/133 |
| RE34,585 E * | 4/1994 | Schmidt, Jr. | ............... | E03F 9/00 254/323 |
| 5,312,551 A * | 5/1994 | Perron | ............... | C02F 1/52 210/392 |
| 5,336,333 A * | 8/1994 | Sheppard | ............... | E03F 9/00 134/22.12 |
| 5,341,539 A * | 8/1994 | Sheppard | ............... | E03F 9/00 15/302 |
| 5,385,752 A * | 1/1995 | Steele | ............... | B05B 9/03 427/317 |
| 5,428,862 A * | 7/1995 | Sailer | ............... | B08B 9/043 15/387 |
| 5,452,853 A | 9/1995 | Shook | | |
| 5,522,646 A | 6/1996 | Friedman | | |
| 5,598,866 A * | 2/1997 | Nelson | ............... | B65H 75/425 137/355.27 |
| 5,636,648 A * | 6/1997 | O'Brien | ............... | E03F 7/10 134/107 |
| 5,762,083 A * | 6/1998 | Bate | ............... | B08B 9/043 134/201 |
| 5,794,723 A * | 8/1998 | Caneer, Jr. | ............... | E21B 19/155 175/85 |
| 5,948,171 A * | 9/1999 | Grothaus | ............... | B08B 3/12 134/22.12 |
| 6,059,214 A * | 5/2000 | Rashidi | ............... | B60P 3/224 187/229 |
| 6,170,577 B1 * | 1/2001 | Noles, Jr. | ............... | E21B 37/00 134/22.12 |
| 6,347,761 B1 * | 2/2002 | Larson | ............... | B65H 54/74 242/397.3 |
| 6,437,285 B1 * | 8/2002 | Thomas | ............... | B23K 26/142 219/121.75 |
| 6,438,792 B1 * | 8/2002 | Cappellotto | ............... | E03F 7/10 15/302 |
| 6,474,349 B1 * | 11/2002 | Laker | ............... | E21B 37/00 134/22.12 |
| 6,474,926 B2 * | 11/2002 | Weiss | ............... | B65D 88/30 414/919 |
| 6,523,554 B1 * | 2/2003 | Bryant, Sr. | ............... | B08B 9/0495 210/162 |
| 6,699,324 B1 * | 3/2004 | Berdin | ............... | B05B 13/0636 427/236 |
| 6,764,604 B1 * | 7/2004 | Nezat, II | ............... | B01D 21/2444 210/167.01 |
| 6,790,368 B1 * | 9/2004 | Vachon | ............... | E03F 7/103 15/340.1 |
| 6,820,653 B1 * | 11/2004 | Schempf | ............... | F16L 55/26 15/104.31 |
| 7,182,163 B1 * | 2/2007 | Gipson | ............... | B60S 9/20 180/8.5 |
| 7,308,953 B2 * | 12/2007 | Barnes | ............... | E21B 7/02 175/203 |
| 7,670,086 B2 | 3/2010 | Kiest, Jr. | | |
| 7,979,944 B1 * | 7/2011 | Martin, III | ............... | B08B 9/035 134/167 R |
| 8,250,816 B2 * | 8/2012 | Donnally | ............... | E21B 15/00 52/745.18 |
| 8,328,290 B2 * | 12/2012 | Malatesta | ............... | B60P 3/2245 298/17 R |
| 8,468,753 B2 * | 6/2013 | Donnally | ............... | E21B 15/00 173/186 |
| 8,500,429 B2 | 8/2013 | Kiest, Jr. | | |
| 8,739,354 B2 * | 6/2014 | Buckner | ............... | E02F 3/384 15/340.1 |
| 8,887,800 B2 * | 11/2014 | Havinga | ............... | E21B 19/22 166/77.2 |
| 9,862,437 B2 * | 1/2018 | Smith | ............... | B62D 57/032 |
| 10,024,459 B1 * | 7/2018 | Friedlein | ............... | F16L 1/032 |
| 10,125,577 B1 * | 11/2018 | Carter | ............... | B08B 9/04 |
| 10,132,426 B2 * | 11/2018 | Baker | ............... | F16L 1/065 |
| 10,450,771 B2 * | 10/2019 | Buckner | ............... | B66C 1/427 |
| 10,799,899 B2 | 10/2020 | Schuetz | | |
| 10,875,040 B2 | 12/2020 | Rancourt | | |
| D910,252 S | 2/2021 | Schuetz | | |
| 11,136,213 B2 * | 10/2021 | Russell | ............... | B65H 75/30 |
| 11,253,883 B1 * | 2/2022 | Gohl | ............... | B05B 13/0636 |
| 11,351,903 B1 * | 6/2022 | Williamson | ............... | B60P 1/027 |
| 2002/0036012 A1 * | 3/2002 | Spear | ............... | B65H 75/4407 137/355.22 |
| 2002/0104900 A1 * | 8/2002 | Borcea | ............... | B05B 13/0627 239/548 |
| 2003/0070694 A1 * | 4/2003 | McCleary | ............... | B08B 9/027 134/8 |
| 2004/0089323 A1 * | 5/2004 | Hatley | ............... | E21B 37/02 134/8 |

(56) References Cited

U.S. PATENT DOCUMENTS

| | | | |
|---|---|---|---|
| 2004/0211598 A1* | 10/2004 | Palidis | E21B 7/02 175/203 |
| 2004/0240973 A1* | 12/2004 | Andrews | E21B 41/00 414/332 |
| 2005/0161221 A1* | 7/2005 | Diamond | E21B 37/00 166/311 |
| 2005/0217855 A1* | 10/2005 | Stave | E21B 23/08 166/304 |
| 2005/0236042 A1* | 10/2005 | Hansen | B08B 9/032 137/236.1 |
| 2005/0252531 A1* | 11/2005 | Landaas | B08B 9/0433 134/22.12 |
| 2006/0027373 A1* | 2/2006 | Carriere | E21B 19/22 166/77.2 |
| 2006/0179603 A1* | 8/2006 | Polston | E03F 9/00 15/340.1 |
| 2006/0213653 A1* | 9/2006 | Cunningham | E21B 7/024 166/85.1 |
| 2007/0163938 A1* | 7/2007 | Davis | B30B 9/067 210/523 |
| 2009/0200856 A1* | 8/2009 | Chehade | E21B 7/02 299/30 |
| 2009/0205675 A1* | 8/2009 | Sarkar | B08B 9/04 134/1 |
| 2009/0283324 A1* | 11/2009 | Konduc | A61P 9/00 175/57 |
| 2009/0288834 A1* | 11/2009 | Erkol | E21B 37/00 166/222 |
| 2010/0095559 A1* | 4/2010 | Buckner | E02F 3/8825 37/304 |
| 2010/0186945 A1* | 7/2010 | Hagen | E21B 37/00 166/66.5 |
| 2011/0114386 A1* | 5/2011 | Souchek | E21B 7/02 175/52 |
| 2012/0097192 A1* | 4/2012 | Crawford | B08B 9/0557 134/22.12 |
| 2012/0247570 A1* | 10/2012 | Zink | B08B 9/0813 137/15.01 |
| 2013/0284422 A1* | 10/2013 | Irvine | E21B 37/00 210/167.01 |
| 2014/0299158 A1* | 10/2014 | Cooper | B08B 9/043 134/22.12 |
| 2014/0338926 A1* | 11/2014 | Baugh | B08B 9/0551 166/387 |
| 2015/0165497 A1* | 6/2015 | Bozso | B08B 9/04 134/105 |
| 2015/0308233 A1* | 10/2015 | Parker | B08B 9/00 15/94 |
| 2015/0360259 A1* | 12/2015 | Polston | B08B 9/0535 134/169 C |
| 2015/0360265 A1* | 12/2015 | Thomas | B08B 9/043 15/104.05 |
| 2016/0001832 A1* | 1/2016 | Beiler | B62D 59/04 414/550 |
| 2016/0251940 A1* | 9/2016 | De Witt | E21B 7/14 166/304 |
| 2016/0256903 A1* | 9/2016 | Motzo | F16L 55/30 |
| 2016/0288176 A1* | 10/2016 | Englent | E03F 9/002 |
| 2017/0197536 A1* | 7/2017 | Mayer | B60R 19/24 |
| 2017/0203338 A1* | 7/2017 | Harr | E03F 9/002 |
| 2017/0203342 A1* | 7/2017 | Hunter | G06T 7/74 |
| 2017/0234458 A1* | 8/2017 | Baker | F16L 1/065 226/1 |
| 2017/0307312 A1* | 10/2017 | Wall | G01S 17/04 |
| 2018/0009011 A1* | 1/2018 | Polston | B08B 9/0535 |
| 2018/0099837 A1* | 4/2018 | Bambauer | B65H 75/4489 |
| 2018/0230689 A1* | 8/2018 | Schaafsma | F16D 1/112 |
| 2018/0328146 A1* | 11/2018 | Kartha | E21B 41/0078 |
| 2019/0060965 A1* | 2/2019 | MacNeil | B08B 9/0321 |
| 2019/0086017 A1* | 3/2019 | Illingworth | F16L 55/1141 |
| 2019/0093382 A1* | 3/2019 | Sauber | E04H 12/187 |
| 2019/0120002 A1* | 4/2019 | Zhang | F04B 49/065 |
| 2019/0169961 A1* | 6/2019 | Dennis | B08B 9/0433 |
| 2019/0194929 A1* | 6/2019 | Schneider | E03F 9/005 |
| 2019/0271143 A1* | 9/2019 | Iwasaki-Higbee | B01D 21/262 |
| 2019/0301660 A1* | 10/2019 | Hale | F16L 55/38 |
| 2019/0351801 A1* | 11/2019 | Rousselle | B60P 1/36 |
| 2019/0360289 A1* | 11/2019 | Jones | B08B 9/032 |
| 2019/0375326 A1* | 12/2019 | Merth | B65H 75/425 |
| 2020/0078838 A1 | 3/2020 | Hengen | |
| 2020/0122625 A1* | 4/2020 | Sutherland | B62D 63/08 |
| 2020/0230668 A1* | 7/2020 | Baek | B08B 9/051 |
| 2020/0290098 A1* | 9/2020 | Vazzana | B08B 9/035 |
| 2020/0344945 A1* | 11/2020 | Bambauer | B62D 21/17 |
| 2020/0398320 A1* | 12/2020 | Cole | B08B 9/0808 |
| 2021/0001939 A1* | 1/2021 | Beiler | B60K 7/0007 |
| 2021/0172291 A1* | 6/2021 | Al-Qasim | E21B 47/00 |
| 2021/0332671 A1* | 10/2021 | Howitt | B08B 9/04 |
| 2022/0080475 A1* | 3/2022 | Carnell | B01F 35/1453 |

\* cited by examiner

TRAILER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

The described example embodiments in general relate to a trailer system for transporting a cavity cleaning and coating system for safely and efficiently cleaning and coating the interior of a cavity without requiring entry of any workers.

Related Art

Any discussion of the related art throughout the specification should in no way be considered an admission that such related art is widely known or forms part of common general knowledge in the field.

The interior of cavities such as manholes require routine maintenance. Such cavities, which are typically vertical or substantially vertical openings extending into the ground surface, can develop build-ups of grime or contaminants over time. Thus, it is important to routinely clean such cavities to remove such grime or contaminants. It is also important to coat the interior of such cavities to reduce the future build-up of such grime or contaminants. Such coatings may include various types of paints or other films, coatings, and the like which are applied to the interior of the cavity after cleaning.

In the past, maintenance of cavities such as manholes has required entry of a worker down into the cavity. This can present a number of risks to the worker, as the worker will be required to be lowered into an enclosed space and may be exposes to sewer gases or other biological contaminants.

A cavity cleaning and coating system that is mounted onto a movable arm of a vehicle or the like may eliminate this risk. Specifically, the cavity cleaning and coating system may be capable of being positioned over and lowered into the cavity so that a worker does not need to be lowered into the cavity.

However, this may require an entire vehicle be dedicated to the purpose of transporting the cavity and cleaning and coating system, which can be expensive. Also, such a vehicle may have difficulty accommodating the necessary auxiliary equipment, and providing suitable stability for the long movable arm during transit.

SUMMARY

Some of the various embodiments of the present disclosure relate to a trailer system that can more easily transport a cavity cleaning and coating system. Some of the various embodiments of the present disclosure include trailer system that allows the cavity cleaning and coating system, as well as some auxiliary equipment to be more easily transported. In some embodiments, a trailer system according to an embodiment of the present disclosure may comprise a frame, a bed that is attached to the frame, a pair of ground engaging elements that are attached to the frame, and a lifting and reclining assembly that is attached to the frame.

In some other embodiments, the trailer system may comprise an elongated frame defining a longitudinal direction, and a lateral direction. The trailer system may also include a bed that is attached to the elongated frame, a plurality of auxiliary equipment assemblies resting on the bed, and a lifting and reclining assembly that is attached to the frame.

In yet further embodiments, the lifting and reclining assembly may include a bottom assembly, a top assembly, and a lifting mechanism that is attached to the bottom assembly, and the top assembly.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

Figure 1:
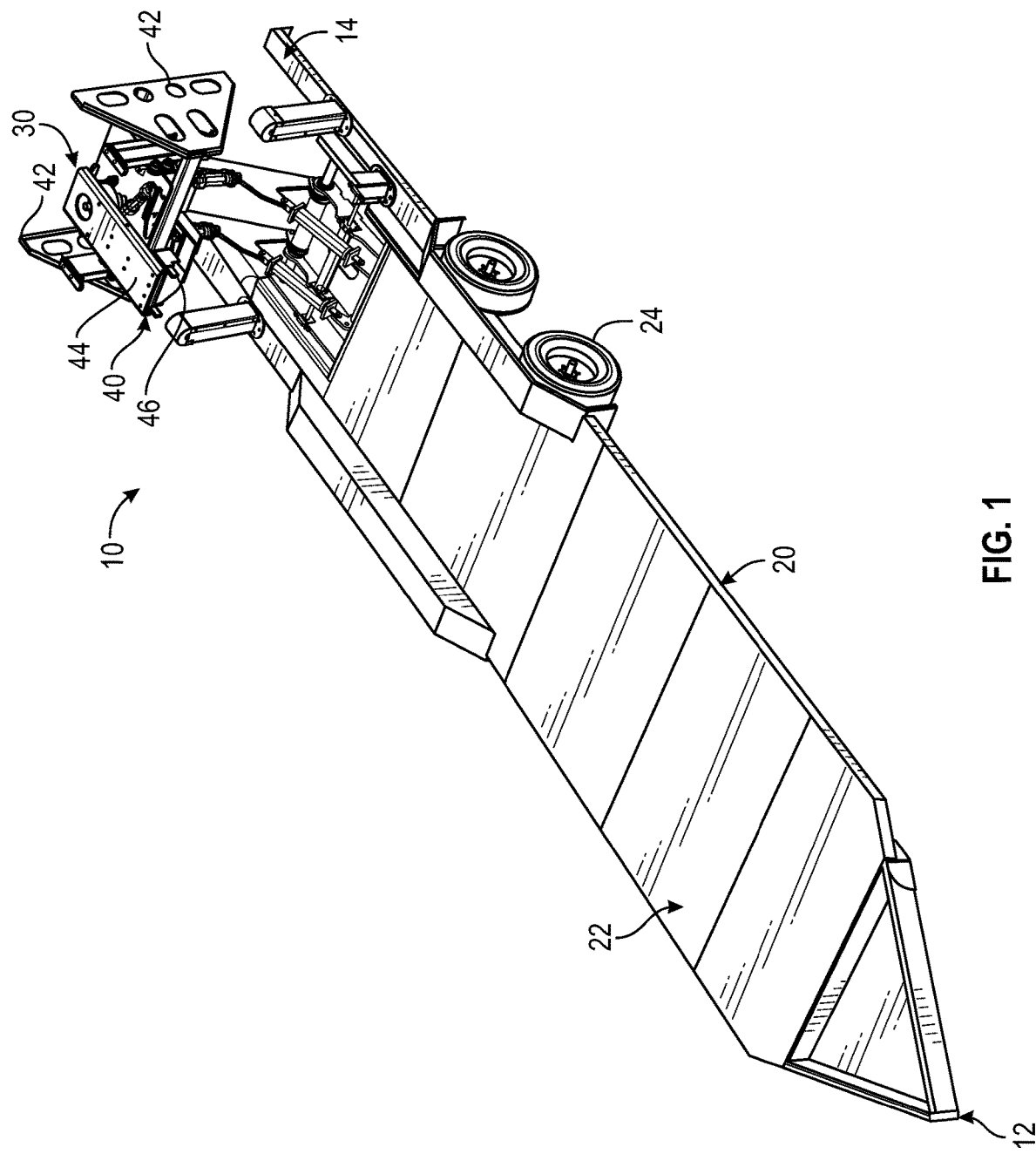
FIG. 1 is a perspective view of a trailer system in accordance with an example embodiment.
Figure 2:
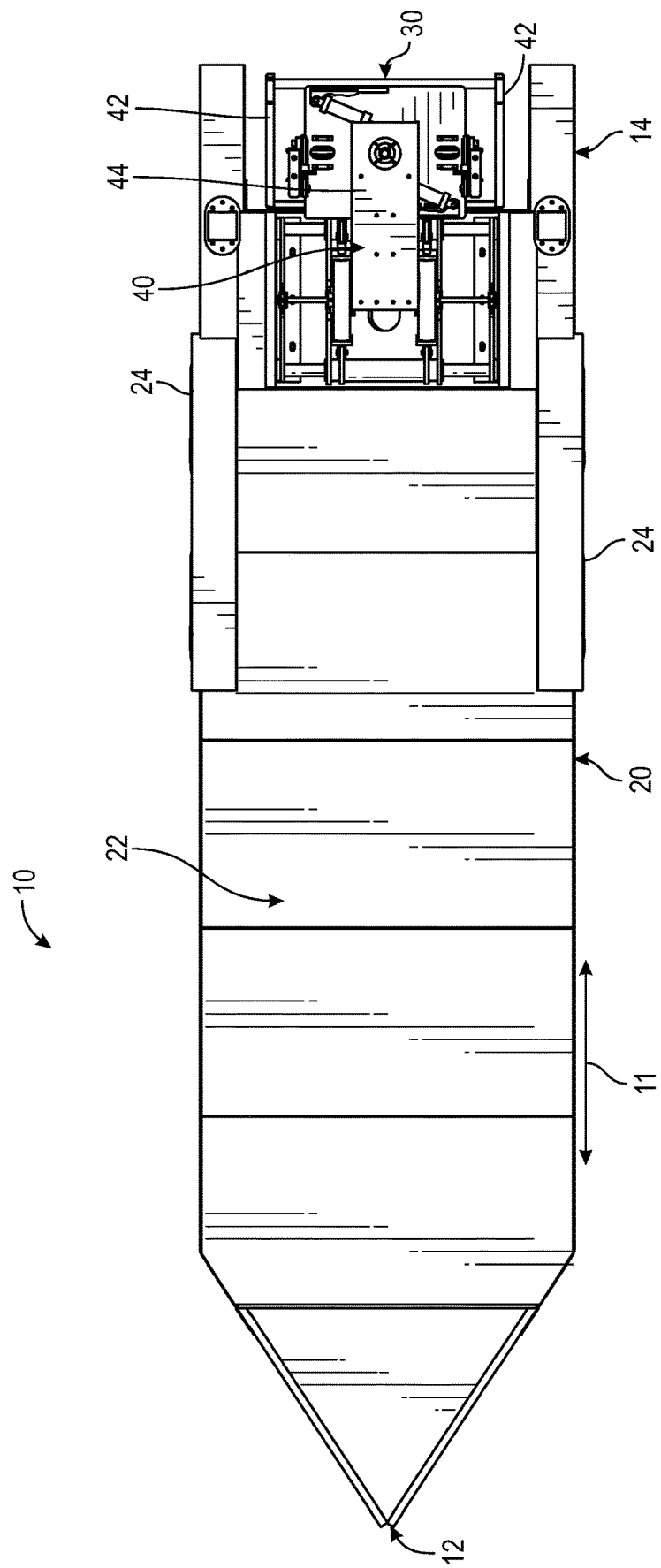
FIG. 2 is a top view of the trailer system of FIG. 1.

U.S. Pat. No. 11,253,883 (hereinafter, the '883 patent), the entire disclosure of which, except for any definitions, disclaimers, disavowals, and inconsistencies, is incorporated herein by reference.

A. Overview

Some of the various embodiments of the present disclosure relate to a trailer system 10 that can more easily transport a cavity cleaning and coating system similar or identical to that disclosed in the '883 patent as well as some desired auxiliary equipment. Some of the various embodiments of the present disclosure include a trailer system 10 comprising a lifting and reclining assembly 30 that is attached to the frame 20. In some example embodiments, the trailer system 10 includes a plurality of auxiliary equipment assemblies that rest on the bed 22 of the trailer system 10. In some other example embodiments, the lifting and reclining assembly 30 includes a bottom assembly 60, a top assembly 80, and a lifting mechanism 100 that is interposed between the top assembly 80, and the bottom assembly 60. Various embodiments of the trailer system 10 may increase the ease and the stability of the system in transit.

B. Trailer System

The trailer system 10 includes a frame 20, a bed 22 attached to the frame 20, a pair of ground engaging elements 24 (e.g., crawler tracks, tires as shown, etc.) attached to the frame 20, and a lifting and reclining assembly 30 attached to the frame 20.

More specifically as seen in FIGS. 1 thru 3A, the trailer system 10 may include a front hitch portion 12, and an apertured rear portion 14 that receives the lifting and reclining assembly 30, allowing the lifting and reclining assembly 30 to raise and lower a cavity cleaning and coating system 16. A mounting assembly 40 may be provided that is connected to the lifting and reclining assembly 30, as well as a cavity cleaning and coating system 16.

Figure 3A:
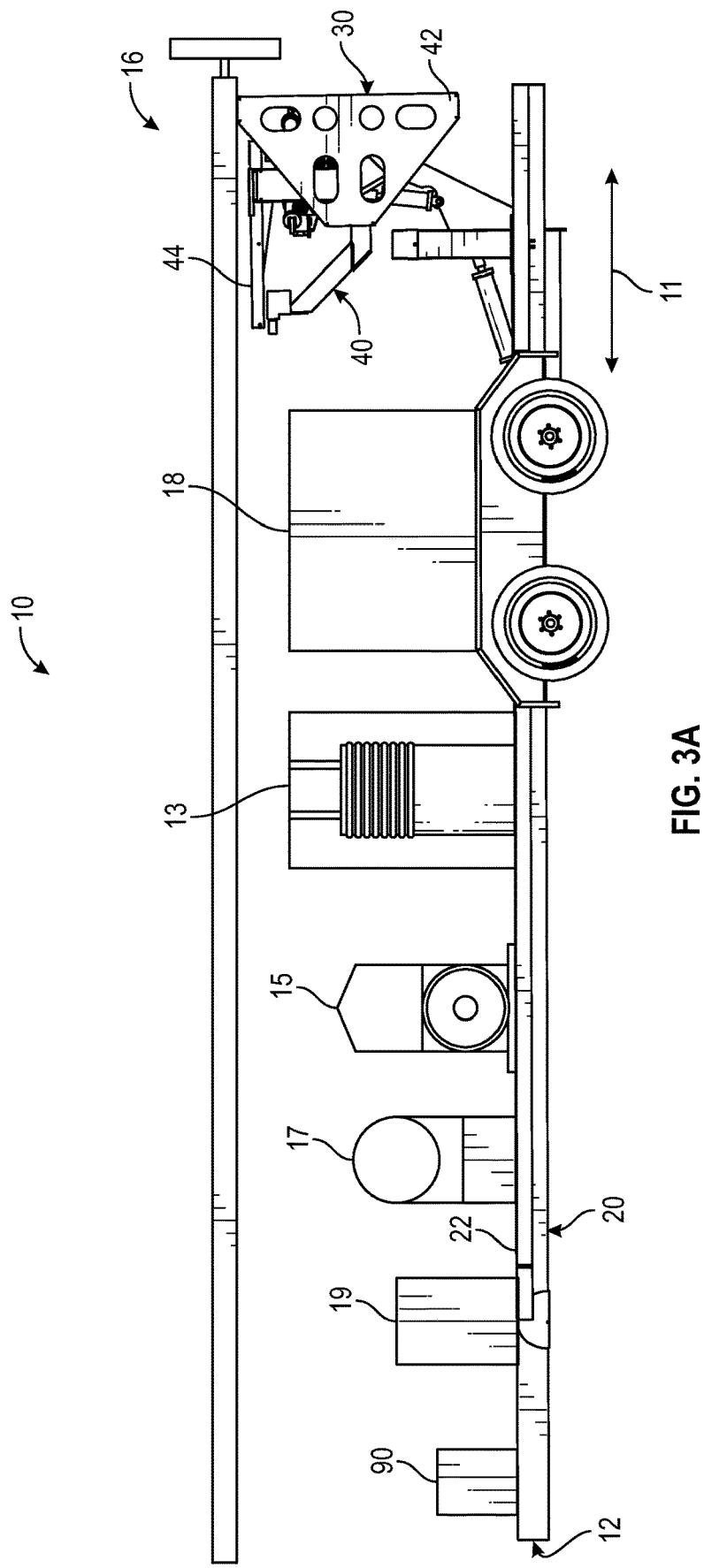
FIG. 3A is a side view of the trailer system of FIG. 1 with the movable arm having a cavity cleaning and coating system attached thereto shown attached to a lifting and reclining assembly.

In addition as shown in FIG. 3A, a first storage tank 18 (e.g., a water storage tank) may be provided that rests on the bed 22 adjacent to the lifting and reclining assembly 30 along the longitudinal direction 11. Next, a control and mixing assembly 13 may be provided that rests on the bed 22 adjacent to the first storage tank 18 along the longitudinal direction 11. This assembly may also be able to heat the combined water and cleaning solution.

Also, a motor and a pump assembly 15 may be provided that rests on the bed 22 that is adjacent to the control and mixing assembly 13 along the longitudinal direction 11. A second storage tank 17 (e.g., a smaller tank than the first storage tank for storing a cleaning/coating fluid) may be provided that rests on the bed 22 adjacent to the motor and the pump assembly 15. Next, a first storage bin 19 (e.g., a plastic storage bin) may be provided that rests on the bed 22 along the longitudinal direction 11 adjacent to the second storage tank. A second storage bin 90 (e.g., a smaller tool chest than the first storage bin that is at least partially metallic) may be provided that rests on the bed 22 longitudinally between the first storage bin 19, and a front hitch portion 12 of the trailer system 10.

Since everything needed for a cleaning or a coating operation is provided on the trailer, the trailer system 10 and the cavity cleaning and coating system 16 can be effectively transported to a desired spot by pulling the trailer system 10 to the spot. Also, the extended length of the trailer system 10 provides more stability during transit since the center of gravity is nearer the middle of the trailer.

While not specifically shown or pointed out in the drawings, it is to be understood that the various assemblies, storage tanks, etc. are in communication with each other in various ways including electrically, mechanically, hydraulically, etc.

C. Trailer Frame and Bed

Figure 4:
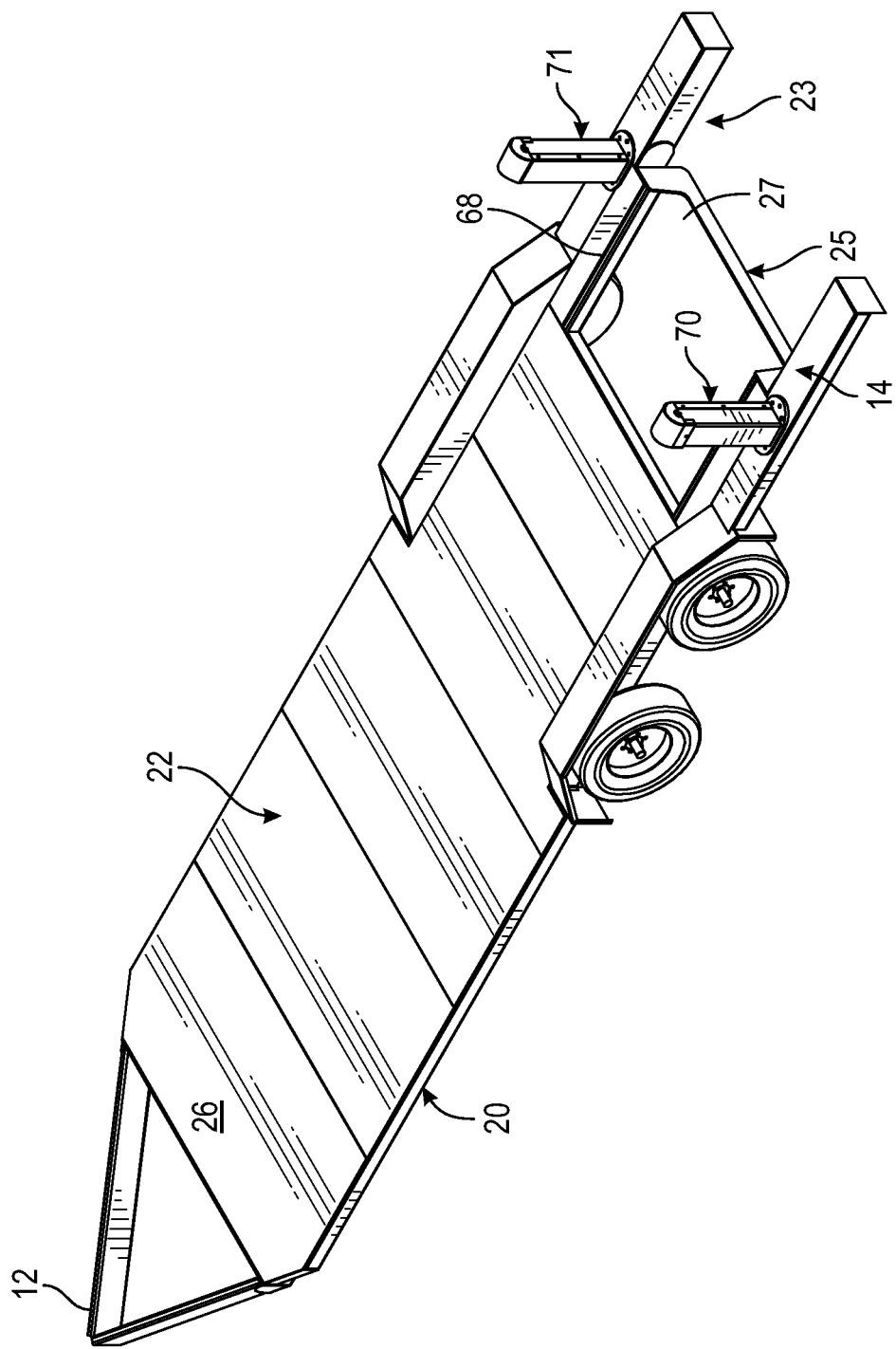
FIG. 4 is a perspective view of the trailer system of FIG. 1 with the lifting and reclining assembly removed.

As best seen in FIGS. 3A and 4, the frame 20 of the trailer may be covered by a plurality panels 26, forming a bed 22 upon which the various auxiliary equipment assemblies (e.g., the first storage tank 18, the second storage tank 17, the first storage bin 19, the second storage bin 90, the motor and pump assembly 15, the control and mixing assembly 13, etc.) may rest. The panels 26 may be apertured, corrugated, textured, etc. to help provide traction.

Figure 5:
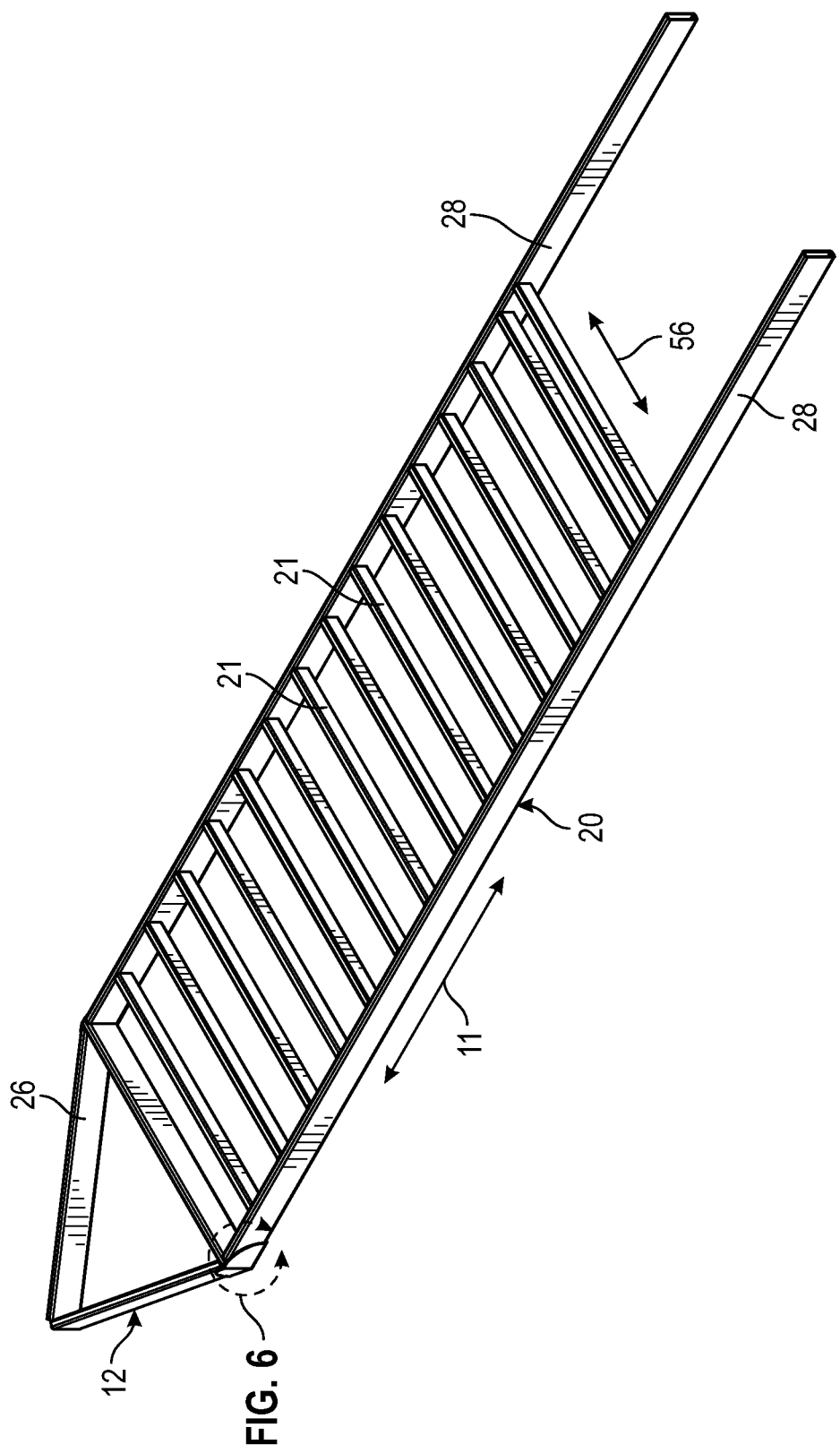
FIG. 5 is a perspective view of the trailer system of FIG. 4 with the bed plates, wheel and axle assemblies, and vertical stabilizer assembled removed, revealing the frame that is shown in isolation.

The frame 20 in FIG. 5 is shown to comprise a plurality of metallic tubes that are joined together. The front hitch portion 12 is formed by a triangular arrangement 26 of these metallic tubes, while the rest of the frame 20 is formed of a rectangular array of metallic tubes including two main side tubes 28, and a plurality of joist tubes 21 that connect to the main side tubes 28. Any of the metallic tubes may be joined to each other in any suitable manner including fastening, welding, etc. In some embodiments, the joist tubes 21 may be suitably close to each other such that the use of panels 26 to form the bed 22 is not necessary. That is to say, the joist tubes 21 themselves may act as the bed 22.

Figure 6:
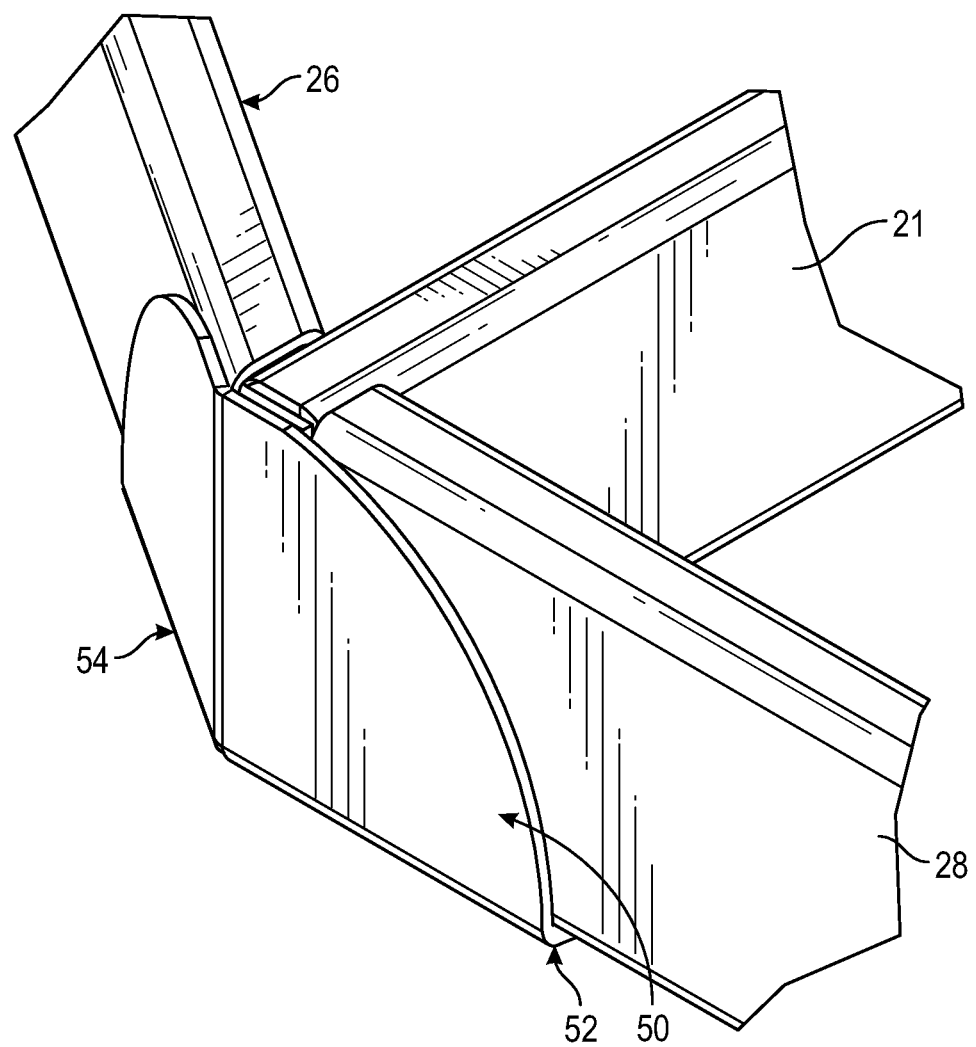
FIG. 6 is a detail view of a joint of the frame of FIG. 5 that is held together using a bracket.

Also, FIG. 6 illustrates that a bracket 50 may be provided to connect multiple tubes together. In this instance, the bracket 50 is used to attach the triangular arrangement 26 of the front hitch portion 12 to the first joist tube 21, and one of the main side tubes 28. The bracket 50 includes a right angle portion 52 for connecting to the bottom of these tubes, and an obtuse angle portion 54 that connects to their side surfaces. The bracket 50 may be welded or fastened to all three tubes.

As alluded to earlier herein and understood by looking at FIG. 5 together, the bed 22 may rest on the frame 20 that may be elongated defining a longitudinal direction 11 (e.g., this is the direction in which the mains side tubes 28 extend), and a lateral direction 56 (e.g., this is the direction in which the joist tubes 21 extend).

In FIG. 4, the frame 20 may define a rearward facing slot 23 that is configured to receive at least a portion of the lifting and reclining assembly 30. At least a first vertical stabilizer 70, as well as possibly a second vertical stabilizer 71 may be provided that are laterally adjacent the rearward facing slot 23. Specifically, the first and the second vertical stabilizers 70, 71 may be positioned diametrically opposite each other being aligned laterally. The first and the second vertical stabilizers 70, 71 may use a vertical hydraulic cylinder 72 that lowers a foot 73 to contact the ground (see FIG. 3B) before the lifting and reclining assembly 30 is lowered to allow the cavity cleaning and coating system 16 to be lowered into the cavity.

Still referring to FIG. 4, the rearward facing slot 23 may extend longitudinally through a rear portion of the elongated frame 20 forming a U-shaped portion (e.g., see apertured rear portion 14). Also, a floor beam 25 may extend laterally across the rearward facing slot 23 that at least partially defines the rearward facing slot 23. More particularly, the floor beam 25 may define a cutout 27 for receiving a portion of the cavity cleaning and coating system 16 (see also FIG. 2).

D. Lifting and Reclining Assembly

Figure 7:
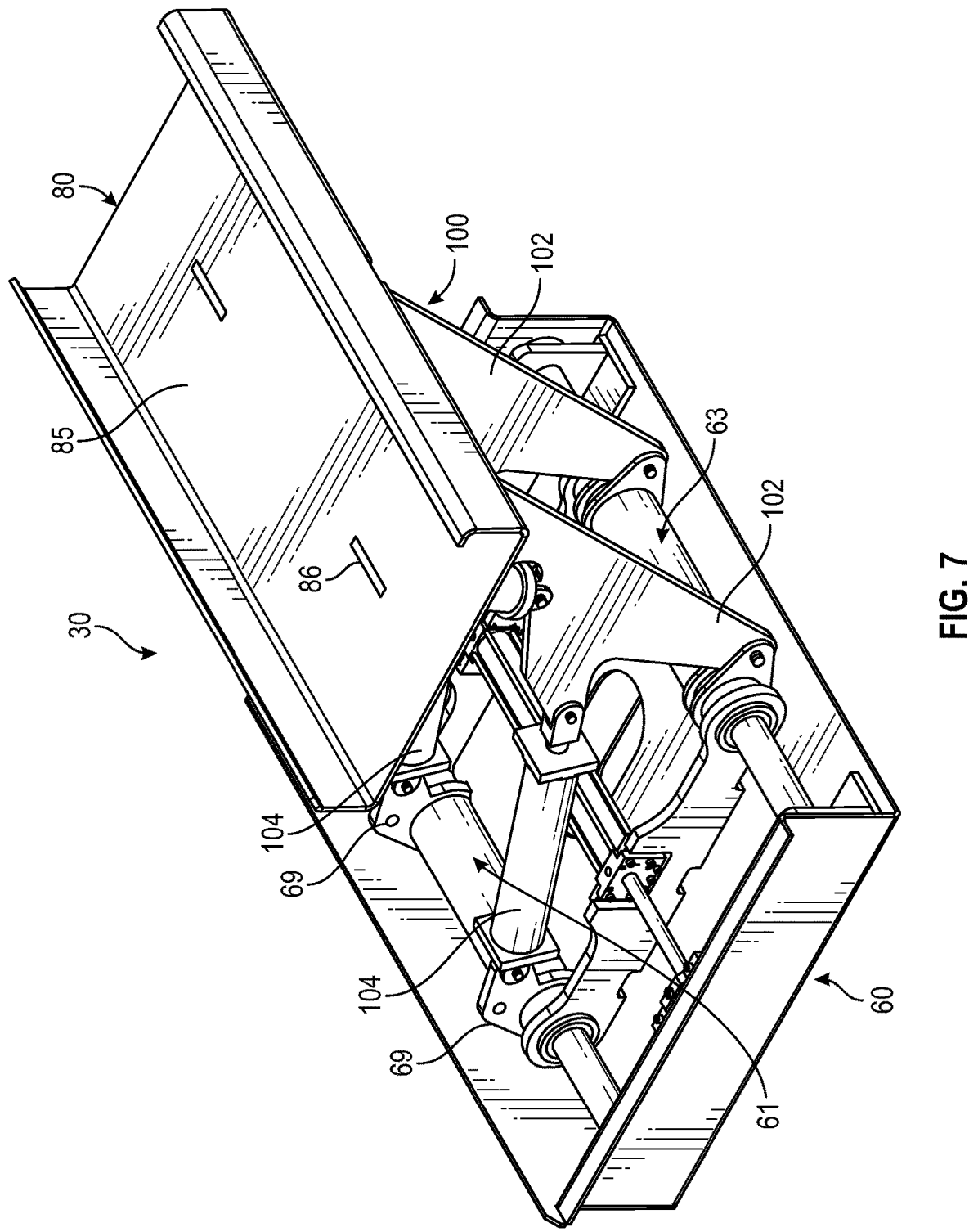
FIG. 7 is a perspective view of the lifting and reclining assembly of the trailer system of FIG. 1 shown in isolation.
Figure 8:
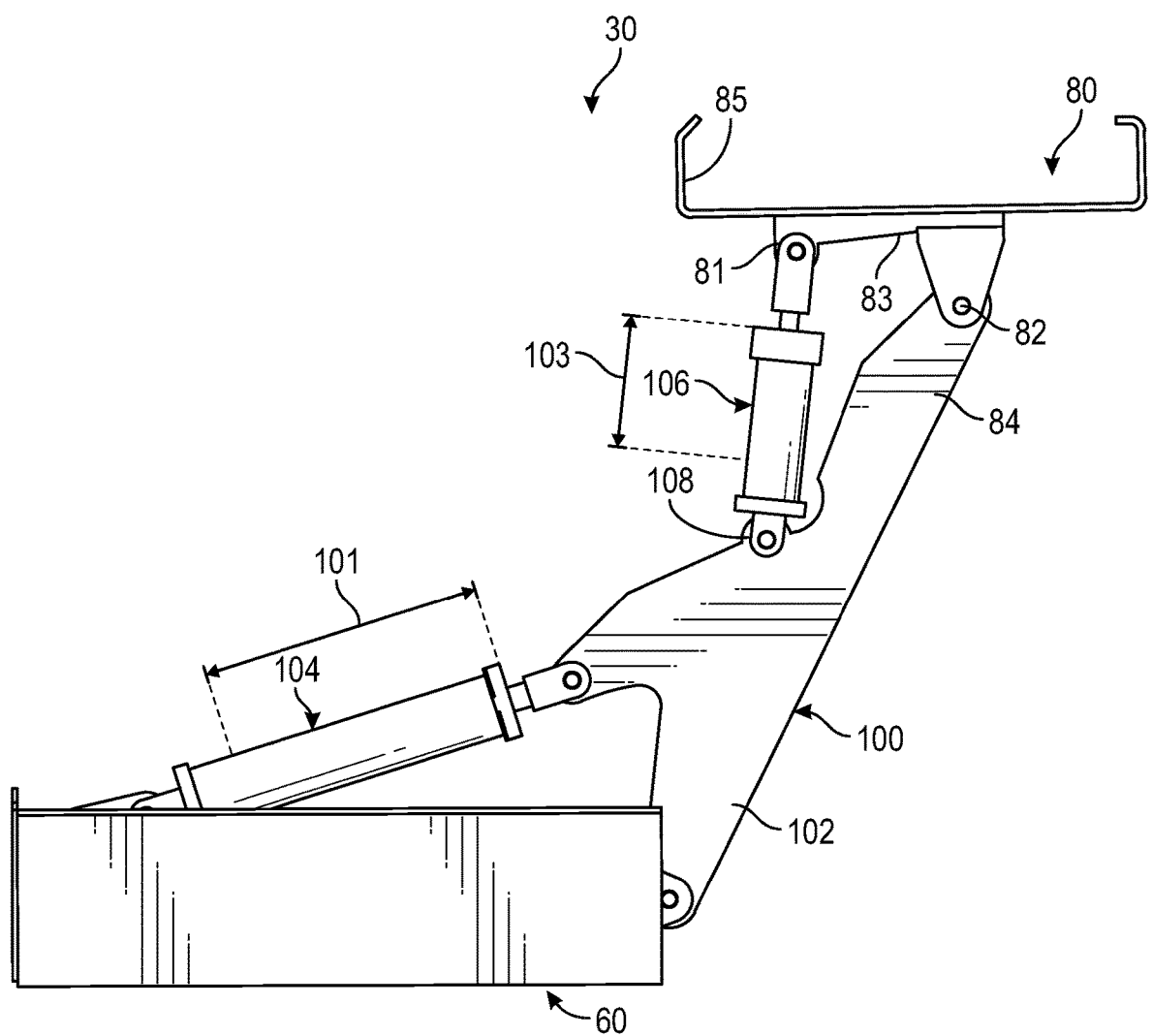
FIG. 8 is a front view of the lifting and reclining assembly of FIG. 7.
Figure 9:
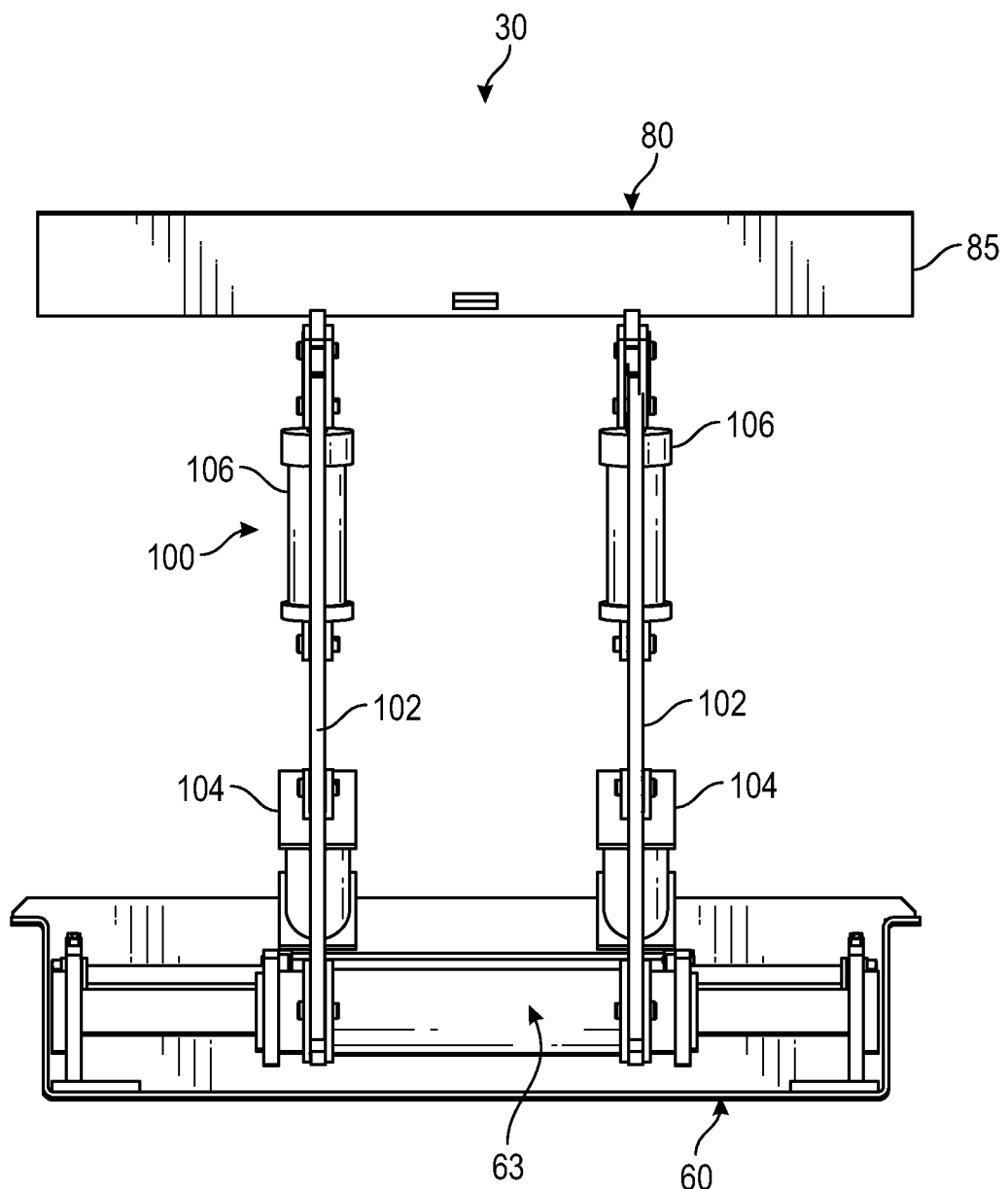
FIG. 9 is a side view of the lifting and reclining assembly of FIG. 8.

Turning to FIGS. 7 thru 9, the lifting and reclining assembly 30 may comprise a bottom assembly 60, a top assembly 80, and a lifting mechanism 100 attached to the bottom assembly 60, and the top assembly 80.

Figure 3B:
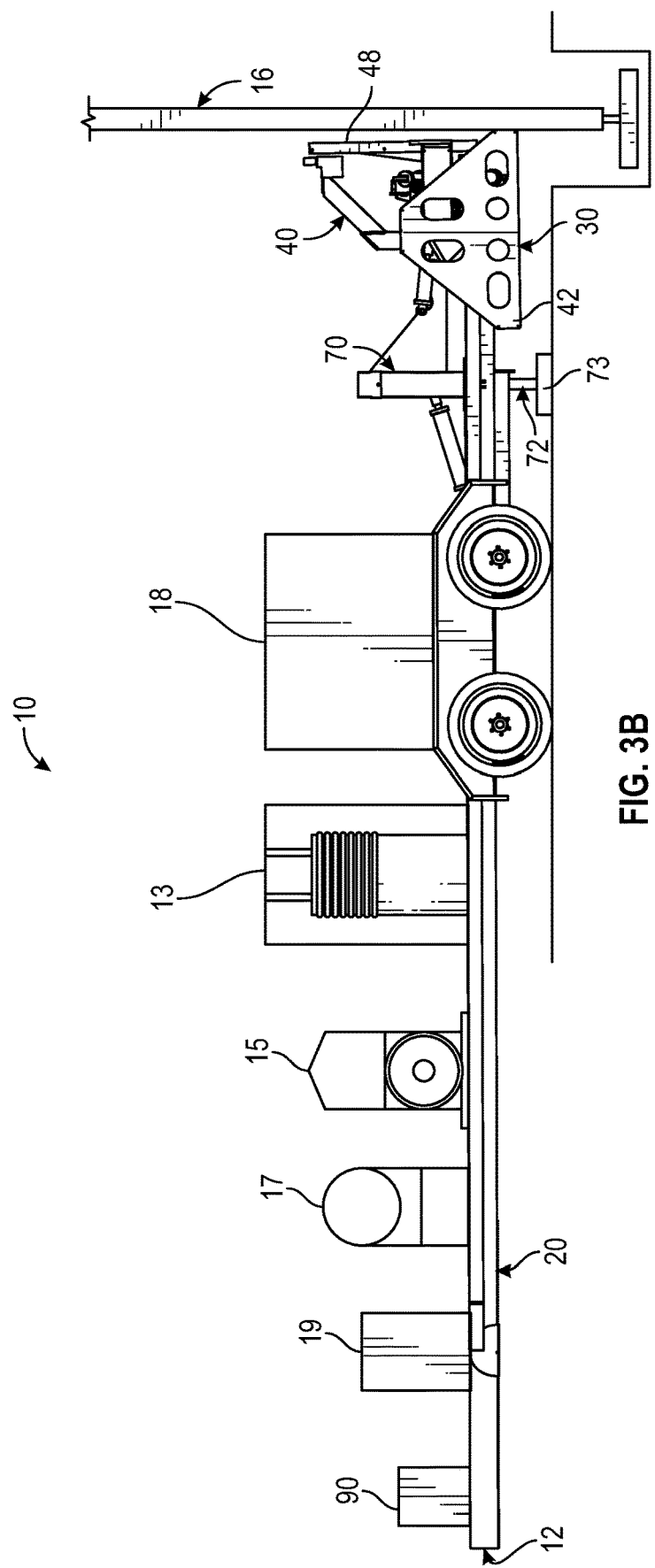
FIG. 3B is a side view of the trailer system of FIG. 3A with the movable arm and the cavity cleaning and coating system being manipulated over a cavity by the lowering of the lifting and reclining assembly. Also, the vertical stabilizers are shown lowered to provide stability for the operation.

The bottom assembly 60 may be configured to be attached to the frame 20 in a manner that will be described more thoroughly later herein. The top assembly 80 may be configured to be attached to a mounting assembly 40 that is in turn attached to the cavity cleaning and coating system 16. This arrangement allows the lifting and reclining assembly 30 to raise and lower the cavity cleaning and coating system 16 as indicated by FIGS. 3A and 3B.

The lifting mechanism 100 will also be described in more detail momentarily. It is powered hydraulically to move the top assembly 80 in an upward facing position (which puts the cavity cleaning and coating system 16 into a stowed position as shown in FIG. 3A), or a backwards facing position (which places the cavity cleaning and coating system 16 into a vertical operating position such as shown in FIG. 3B).

E. Bottom Assembly

Figure 10:
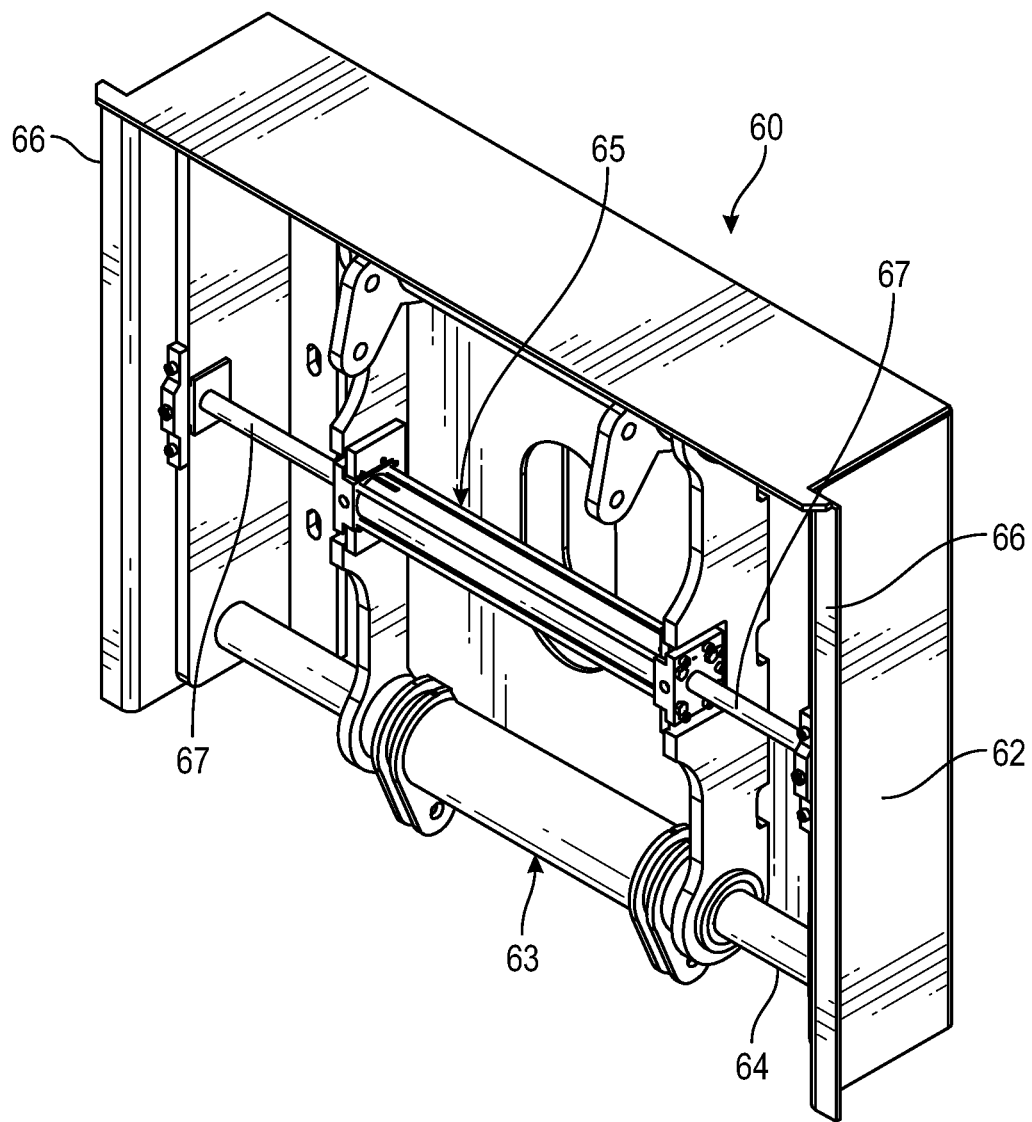
FIG. 10 is a perspective view of the bottom subassembly of the lifting and reclining system of FIG. 7 shown in isolation.
Figure 11:
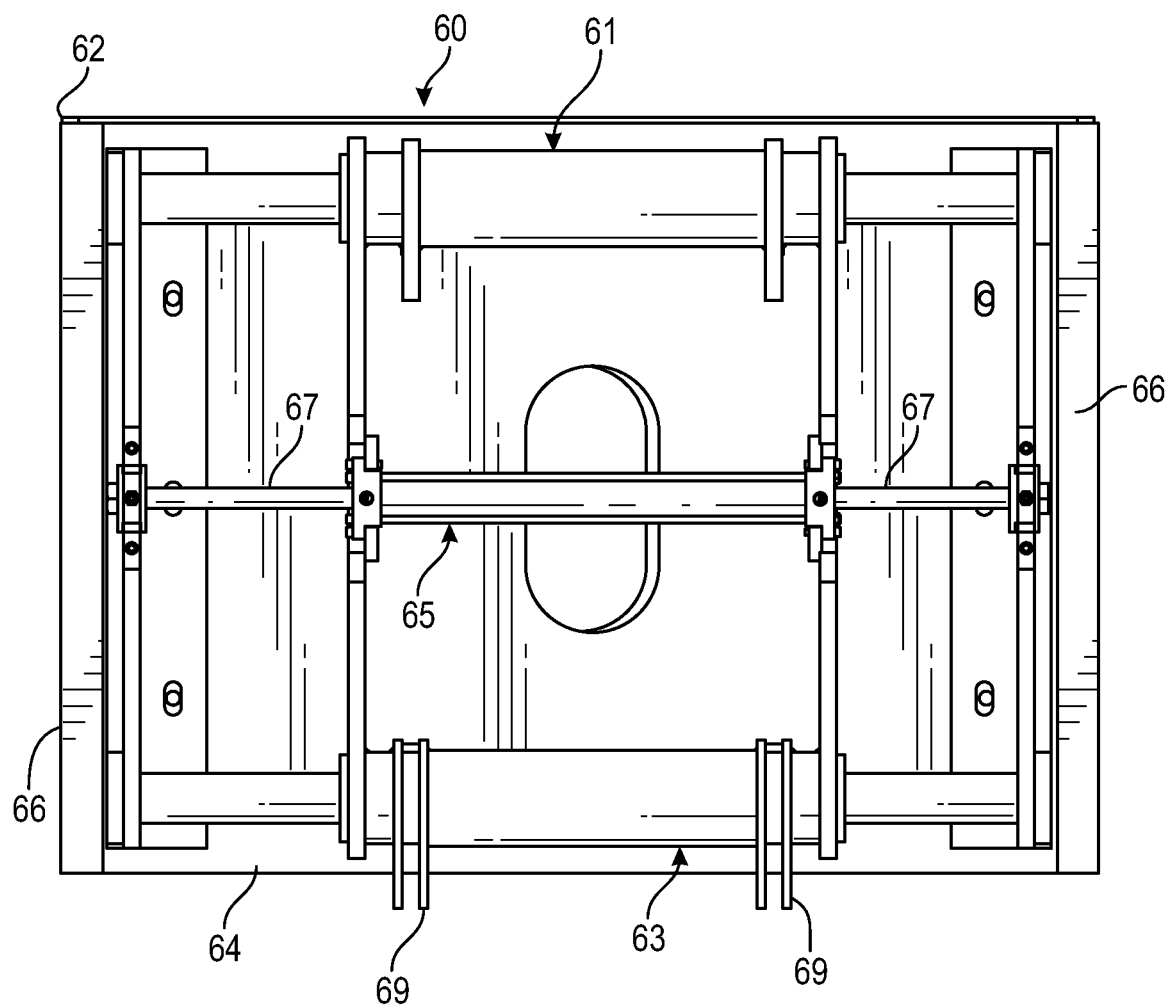
FIG. 11 is a front view of the bottom subassembly of FIG. 10.

In FIGS. 10 and 11, the bottom assembly 60 includes a sheet metal enclosure 62 or the like with one open side 64 that allows the lifting mechanism to extend out toward the rear of the trailer system 10 (see FIGS. 3A and 8). The sheet metal enclosure 62 is configured to fit with the cutout 27 in the floor beam 25 that has been previously mentioned herein, and includes a lip 66 that extends at least partially along its perimeter so that it rests in a matching shaped rectangular aperture 68 formed by the frame 20 (see FIG. 4).

As shown in FIGS. 10 and 11, a first bearing assembly 61 is provided that extends laterally being disposed near the back wall (e.g., opposite of the open side 64) of the sheet metal enclosure 62, while a second bearing assembly 63 may be provided that also extends laterally being disposed near the open side 64 of the sheet metal enclosure 62. A dual action hydraulic cylinder 65 may be interposed longitudinally between the first bearing assembly 61, and the second bearing assembly 63. The shafts 67 of the dual action hydraulic cylinder 65 may extend laterally once the bottom assembly 60 is positioned in the rectangular aperture 68 of the frame 20, causing the sides of the sheet metal enclosure 62 to bulge laterally, holding the bottom assembly 60 in the rectangular aperture 68.

Yokes 69 are provided to attach the first bearing assembly 61 and the second bearing assembly 63 to components of the lifting mechanism 100, allowing the components to rotate as the mechanism lifts or lowers as will be described momentarily herein.

F. Lifting Mechanism

In FIGS. 7 thru 9, it can be seen that the lifting mechanism 100 includes a pair of Y-shaped brackets 102, a pair of lower hydraulic cylinders 104 connecting the bottom assembly 60 to the pair of Y-shaped brackets 102, and a pair of upper hydraulic cylinders 106 connecting the pair of Y-shaped brackets 102 to the top assembly 80.

As just alluded to herein, the bottom assembly 60 includes a first bearing assembly 61, and the pair of downwardly oriented Y-shaped brackets 102 are attached to the first bearing assembly 61 via a pair of lower hydraulic cylinders 104 and the yokes 69. In addition, the bottom assembly 60 includes a second bearing assembly 63 that is spaced longitudinally away from the first bearing assembly 61, and the pair of Y-shaped brackets 102 are attached to the second bearing assembly 63 directly. As the lower hydraulic cylinders 104 expand, the Y-shaped brackets 102 will rotate clockwise as indicated in FIG. 8. Contraction of the lower hydraulic cylinders 104 will cause counterclockwise motion.

The upper hydraulic cylinders 106 connect at a midpoint 108 of the Y-shaped bracket 102, and to the top assembly 80 at a first point, or a first lateral line 81. The top portion of the Y-shaped brackets 102 are also attached to the top assembly 80 at a second point, or a second lateral line 82 that is spaced longitudinally away from the first lateral line 81 a predetermined distance. As the upper hydraulic cylinders 106 expand, the top assembly 80 will rotate clockwise as indicate in FIG. 8. Contraction of the upper hydraulic cylinders 106 will cause counterclockwise motion.

In order to get the desired rotational motions as best seen in FIG. 8, the pair of lower hydraulic cylinders 104 define a first throw-length 101, while the pair of upper hydraulic cylinders 106 define a second throw-length 103 that is less than the first throw-length 101.

G. Top Assembly

Still referring to FIGS. 7 thru 9, the top assembly 80 includes a top bracket 83, and the pair of upper hydraulic cylinders 106 are connected to the top bracket 83 at the midpoint 108 of the pair of Y-shaped brackets 102 along a first lateral line 81 of the top bracket 83, while the pair of Y-shaped brackets 102 are attached to the top bracket 83 at an extremity 84 of the Y-shaped brackets 102 at a second lateral line 82 of the top bracket 83 that is spaced longitudinally away from the first lateral line 81.

The top bracket 83 is attached to the underside of a sheet metal channel member 85 (may be U-shaped or C-shaped), and the top bracket 83 may have fastener receiving holes 86 so that the top assembly 80 may be attached to the mounting assembly 40 that acts as an intermediary between the lifting and reclining assembly 30, and the cavity cleaning and coating system 16.

H. Mounting Assembly

The mounting assembly 40 includes a pair of side mounting plates 42 (may have a truncated triangular shape), a support pad 44, and a bracing structure 46 that connects (directly, or indirectly) the side mounting plates 42 to the support pad 44. The support pad 44 may be a C-shaped sheet metal member that includes fastener receiving apertures for connecting the mounting assembly 40 to the cavity cleaning and coating system 16.

I. Operation of Preferred Embodiment

In use, the trailer system 10 may be transported to a desired location via a truck or other towing vehicle to where a cavity (e.g., a manhole) is located that needs to be cleaned and/or coated. Next, the lifting and reclining assembly 30 may be activated until the cavity cleaning and coating system 16 is positioned over the cavity. Then, the control and mixing assembly 13 may be used to lower the cavity cleaning and coating system 16 into the cavity.

Once the cleaning and/or coating operations are complete, then the cavity cleaning and coating system 16 may be raised and then reclined by reversing the above steps. Then, the trailer system 10 may be transported back to a base station where the auxiliary equipment may be serviced, filled with fluids, etc.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. A remote manhole cleaning system to remove build-ups of grime and contaminates from the interior of a fouled manhole as well as to coat the interior of the manhole to prevent future build ups of the same, the remote manhole cleaning system comprising:
   a frame;
   a bed attached to the frame;
   a pair of ground engaging elements attached to the frame;
   a manhole cleaning and coating assembly having a stowed position that is horizontal and an operating position that is vertical, relative to the bed;
   a mounting assembly connected to the manhole cleaning and coating assembly; and
   a lifting and reclining assembly including a first end attached to the frame and a second end connected to the mounting assembly, the lifting and reclining assembly comprising a first pair of hydraulic cylinders having first ends adjacent the frame and second ends respectively connected to a first portion of a pair of brackets, the pair of brackets each having a second portion spaced from the first portion that is connected to a second pair of hydraulic cylinders that each connect to the mounting assembly;
   wherein the lifting and reclining assembly moves the manhole cleaning and coating assembly between the stowed position for transport of the remote manhole cleaning system and the operating position for remote cleaning and coating of the fouled manhole.

2. The remote manhole cleaning system of claim 1, wherein the remote manhole cleaning system includes a front hitch portion, and an apertured rear portion that receives the lifting and reclining assembly.

3. The remote manhole cleaning system of claim 1, further comprising a first storage tank that rests on the bed adjacent to the lifting and reclining assembly.

4. The remote manhole cleaning system of claim 3, further comprising a control and mixing assembly that rests on the bed adjacent to the first storage tank.

5. The remote manhole cleaning system of claim 4, further comprising a motor and a pump assembly that rests on the bed adjacent to the control and mixing assembly.

6. The remote manhole cleaning system of claim 5, further comprising a second storage tank that rests on the bed adjacent to the motor and the pump assembly.

7. The remote manhole cleaning system of claim 6, further comprising a first storage bin that rests on the bed adjacent to the second storage tank.

8. The remote manhole cleaning system of claim 7, further comprising a second storage bin that rests on the bed between the first storage bin, and a front hitch portion of the remote manhole cleaning system.

9. The remote manhole cleaning system of claim 1, wherein the pair of ground engaging elements include a pair of tires.

10. A remote manhole cleaning system to remove build-ups of grime and contaminates from the interior of a fouled manhole as well as to coat the interior of the manhole to prevent future build ups of the same, the remote manhole cleaning system comprising:
    an elongated frame defining a longitudinal direction, and a lateral direction;
    a bed resting on the elongated frame;
    a pair of ground engaging elements attached to the elongated frame;
    a plurality of auxiliary equipment assemblies resting on the bed;
    a manhole cleaning and coating assembly having a stowed position that is horizontal and an operating position that is vertical, relative to the bed;
    a mounting assembly connected to the manhole cleaning and coating assembly; and
    a lifting and reclining assembly including a first end attached to the elongated frame and a second end connected to the mounting assembly, the lifting and reclining assembly comprising a first pair of hydraulic cylinders having first ends adjacent the elongated frame and second ends respectively connected to a first portion of a pair of brackets, the pair of brackets each having a second portion spaced from the first portion that is connected to a second pair of hydraulic cylinders that each connect to the mounting assembly;
    wherein the lifting and reclining assembly moves the manhole cleaning and coating assembly between the stowed position for transport of the remote manhole cleaning system and the operating position for remote cleaning and coating of the fouled manhole.

11. The remote manhole cleaning system of claim 10, wherein the elongated frame defines a rearward slot that is configured to receive the lifting and reclining assembly.

12. The remote manhole cleaning system of claim 11, further comprising a first vertical stabilizer assembly that is disposed laterally adjacent the rearward slot.

13. The remote manhole cleaning system of claim 12, further comprising a second vertical stabilizer assembly that is disposed laterally adjacent the rearward slot diametrically opposite of the first vertical stabilizer assembly.

14. The remote manhole cleaning system of claim 11, wherein the rearward slot extends longitudinally through a rear portion of the elongated frame, and further comprises a floor beam that extends laterally across the rearward slot that at least partially defines the rearward slot.

15. A remote manhole cleaning system to remove build-ups of grime and contaminates from the interior of a fouled manhole as well as to coat the interior of the manhole to prevent future build ups of the same, the remote manhole cleaning system comprising:
- a frame;
- a bed attached to the frame;
- a pair of ground engaging elements attached to the frame;
- a manhole cleaning and coating assembly having a stowed position that is horizontal and an operating position that is vertical, relative to the bed;
- a mounting assembly connected to the manhole cleaning and coating assembly; and
- a lifting and reclining assembly including a first end attached to the frame and a second end connected to the mounting assembly, the lifting and reclining assembly comprising a bottom assembly, a top assembly, and a first pair of hydraulic cylinders having first ends attached to the bottom assembly adjacent the frame and second ends respectively connected to a first portion of a pair of brackets, the pair of brackets each having a second portion spaced from the first portion that is connected to a second pair of hydraulic cylinders that each connect to the top assembly;
- wherein the lifting and reclining assembly moves the manhole cleaning and coating assembly between the stowed position for transport of the remote manhole cleaning system and the operating position for remote cleaning and coating of the fouled manhole.

16. The remote manhole cleaning system of claim 15, wherein the pair of brackets are each Y-shaped.

17. The remote manhole cleaning system of claim 16, wherein the bottom assembly includes a first bearing assembly, and the pair of Y-shaped brackets are attached to the first bearing assembly, and a second bearing assembly that is spaced away from the first bearing assembly, and the pair of the Y-shaped brackets are attached to the second bearing assembly, and the bottom assembly includes a cylinder assembly that is disposed between the first bearing assembly, and the second bearing assembly.

18. The remote manhole cleaning system of claim 16, wherein the top assembly includes a top bracket, the second pair of hydraulic cylinders are connected to the top bracket at a midpoint of the pair of Y-shaped brackets and a first lateral line of the top bracket, and the pair of Y-shaped brackets are attached to the top bracket at an extremity of the Y-shaped brackets, and at a second lateral line of the top bracket that is spaced away from the first lateral line.

19. The remote manhole cleaning system of claim 16, wherein the first pair of hydraulic cylinders define a first throw-length, and the second pair of hydraulic cylinders define a second throw-length that is less than the first throw-length.

* * * * *